United States Patent [19]

Carr

[11] Patent Number: 4,718,002

[45] Date of Patent: Jan. 5, 1988

[54] METHOD FOR MULTIPROCESSOR COMMUNICATIONS

[75] Inventor: Richard W. Carr, Palo Alto, Calif.

[73] Assignee: Tandem Computers Incorporated, Cupertino, Calif.

[21] Appl. No.: 741,659

[22] Filed: Jun. 5, 1985

[51] Int. Cl.⁴ ............................................. G06F 13/00
[52] U.S. Cl. ..................................................... 364/200
[58] Field of Search ... 364/200 MS File, 900 MS File; 371/9; 340/825.05, 825.5, 825.51

[56] References Cited

U.S. PATENT DOCUMENTS

| | | | |
|---|---|---|---|
| 4,412,281 | 10/1983 | Works | 364/200 |
| 4,484,273 | 11/1984 | Stiffler et al. | 364/200 |
| 4,562,535 | 12/1985 | Vincent et al. | 364/200 |
| 4,562,539 | 12/1985 | Vince | 364/200 |
| 4,634,110 | 1/1987 | Julich et al. | 371/11 |
| 4,644,542 | 2/1987 | Aghili et al. | 364/200 |

OTHER PUBLICATIONS

Tanenbaum, *Computer Networks*, 1981, pp. 457-461.

*Primary Examiner*—Raulfe B. Zache
*Assistant Examiner*—Michael J. Ure
*Attorney, Agent, or Firm*—Townsend and Townsend

[57] ABSTRACT

An improved method for communicating updated information among processors in a distributed data processing system. The system includes a plurality of distributed interconnected processors each having a memory. The method includes the steps of prioritizing the processors into a predetermined order, establishing one of the processors as a control processor for the broadcast of update messages, developing an update message in at least one of the processors, selecting in accordance with the control processor one of the processors which has developed an update message as a sender processor, broadcasting the update message of the sender processor to each of the processors, and causing the next processor in order to be selected as control processor in the event that the former control processor fails in service. As one preferred use, the method enables the system to transmit atomic global update messages with a tolerance to multiple processor faults.

26 Claims, 7 Drawing Figures

METHOD FOR MULTIPROCESSOR COMMUNICATIONS

FIELD OF THE INVENTION

The present invention relates to a method for controlling the operations of computing machinery. More particularly, the present invention relates to an improved method for communicating update information among the processors of a multiprocessor computing system. The disclosed communications method has particular application to provide multiple fault tolerance in multiprocessor computing systems.

BACKGROUND OF THE INVENTION

Loosely coupled, distributed multiprocessor computing systems were known in the prior art and have been used in a wide variety of applications and environments. Control information in such systems has been kept by each of the multiple processors in order to ensure that the processors have been operable as a single, unified multiprocessing system. Changes (i.e. updates) to the control information in one processor have required updates to the control information in every other processor, so that the control information kept by the processors has been consistent throughout the system.

In order for the multiple processors to remain coordinated and informed of current system status, global update messages have been broadcast by any one of the processors, acting as a sender processor, to all of the other currently operational processors throughout the system. Herein, a "global update" means an operation carried out in a distributed multiprocessor computing system which makes a consistent change to the control information in all of the operational processors of the system.

For example, an input/output (I/O) device of such a system might have been operated from more than one processor, but the system (all processors) must have agreed as to which processor was to be controlling a given I/O device at any particular time. When control of an I/O device was passed from one processor to another processor, each of the processors of the system was informed of this fact by, e.g., a global update message broadcast from a sender processor to each of the other processors. The update was then made in each processor, so that all processors had accurate, current and consistent control information relating to the system.

In order for control information in each processor to remain consistent, accesses and updates to control information are typically carried out as "atomic operations". An atomic operation is indivisible: one which is begun and completed before it is treated as valid. In order for an operation to be considered to be atomic, each access to control information should be consistent and should not obtain partially updated data; each global update should be carried out successfully on all currently operational processors or on none of them; successive global updates should occur in the same order on all processors; and, each global update procedure should be carried out within some maximum time limit. While atomic operations are desirable for accessing and updating control information, in the prior art, atomic operations provided tolerance for single faults only. Also, it is to be understood that individual processor acceses to control information occur much more frequently than global updates of such information.

A processor failure during a global update broadcast has been a primary cause of inconsistency in control information in prior systems. If a failure of a sending processor occured during an update broadcast, some receiving processors might have been updated and other processors might not have been updated. The failure of a sender processor destroyed the ability of the prior system to make the sender's update global, even though it had reached some of the other processors before the sender failed. Failure of a dedicated update message supervisor processor created the situation where inconsistent updates were likely to be made to control information in various processors throughout the system, leading to inconsistency and potentially to system breakdown.

Schemata are known in the prior art for updating of control information when multiple processors of a distributed multiprocessing system have failed. These schemes typically have been very complicated and have required the passing of an exponential number of messages between the remaining up processors wherein the exponent is related to the number of surviving processors. Such schemes could quickly become computationally intractable. They required too much agreement between the remaining up processors, as well as requiring unacceptable levels of system resources. For example, extensive polling and voting procedures were invoked, and the consequences of majority decisionmaking led to further complications and delays.

One prior art system which has provided an improved level of single-fault tolerance is described in detail in U.S. Pat. No. 4,228,496; and, improvements and variations of the system described in this prior patent are currently offered by the assignee of the present invention in its NonStop TM family of computers. Such systems typically comprise from two to sixteen distributed processors that are connected by a pair of high-speed interprocessor buses. A bus controller enables any processor to send a message directly to any other processor. Interprocessor communications are carried out by messages, rather than by shared memory. Although shared memory is not used in the system described in the prior patent, shared memory may be employed for data storage in a multiprocessor system with some degradation of tolerance to faults: i.e. failure of the shared memory disables the entire system. Providing redundancy in the shared memory to increase fault tolerance significantly increases the number of messages that must be passed and degrades system throughput rate.

The system described in the referenced U.S. Pat. No. 4,228,496 is single-fault tolerant. That is to say, such system continues to function correctly despite the failure of any single component. Each of the two interprocessor buses is a separate component, so that up processors may continue passing message packets back and forth even if one bus fails. If both buses fail, then the processors cannot communicate with each other, and the prior patented system ceases to operate as intended.

In the prior patented system at least two processors can alternatively control every I/O device and other system function (resource). If any one processor fails, then the other processors act to provide the functions formerly provided by the failed processor. If more than one processor fails in the patented system, then the system may cease to provide all functions.

Each processor in the distributed multiprocessing system described in the prior patent is either in an "up"-condition or state or is in a "down" condition or state. An "I'm alive" protocol is employed by each of the up processors of the prior patented system in order to detect the failure of a processor. This protocol is used to keep the control information of the up processors of the system current as to system resources presently available.

In executing the "I'm alive" protocol, about every n seconds, each processor sends an unsequenced acknowledgement message packet over each bus to every other processor. The message packet has two purposes: to recover from lost acknowledgements and to tell the other processors that the sender processor is up. About every 2n seconds, each processor checks whether it has received an unsequenced message packet from every other processor. If a message packet has not been received from a processor thought to be up, the receiver processor considers the sender processor to be down and adjusts its control information to remove the sender processor as an available processor.

The prior patented system used a fixed pair of processors which coordinated global updates. The prior system required a duplicate update message packet to be distributed to each of the coordinating processors. This duplication increased the number of messages required to carry out a global update and provided only single-fault tolerance: if both coordinating processors failed, the system failed to operate properly, since it was then not possible to maintain currency and consistency of control information in the remaining up processors.

Although the single-fault tolerance provided by the prior patented system was a substantial improvement in the art, certain situations have arisen wherein tolerance to multiple faults (failures) of processors is needed. A key requirement in providing tolerance to multiple faults is to maintain consistent control information in all processors remaining up after a processor failure, irrespective of the number of processors that have failed, and irrespective of the failure of the update coordination processor. When multiple failures occurred in the prior art systems, changes in the control information could not be broadcast to every up processor as an atomic operation.

Thus, a hitherto unsolved need has arisen for a simplified and more reliable communications method for a multiprocessor system in which global updates of control information are carried out successfully in the face of multiple faults: failures of multiple processors.

SUMMARY OF THE INVENTION WITH OBJECTS

A general object of the present invention is to provide a communications method for a multiprocessing computing system which overcomes significant limitations and drawbacks of the prior art.

A specific object of the present invention is to provide a multiple fault tolerant global update communications method which is linear and which is vastly more simplified than prior methods.

Another object of the present invention is to provide an improved multiple fault tolerant global update method which recovers from failure of designated update coordination processors.

One more object of the present invention is to provide an efficient method by which identical copies of control information may be maintained in every processor and by which the information may be accessed and updated atomically, and reliably in the event of multiple processor failures.

A further object of the present invention is to provide an optimized linear multiple fault tolerant global update method which requires only one update message for each processor plus one additional message.

An improved method for communicating updated information among processors in a distributed data processing system has been discovered. This new method enables global update messages to be broadcast to the system despite multiple processor failures. In the practice of this new method, each of the processors is provided with message passing means for passing and receiving messages to and from every other one of the processors at intervals to enable each of the processors to monitor current operational status of every other one thereof.

The new method includes the steps of:

prioritizing the processors into a predetermined order,
establishing one of the processors as a first control processor for the broadcast of update messages,
developing an update message in at least one of the processors,
selecting in accordance with the control processor, one of the processors which has developed an update message as a sender processor,
broadcasting the update message of the sender processor to each of the processors, and
causing, in the event the first control processor fails, a next processor in the order to be selected as the control processor thereby assuring that a processor will always be available to take over as the control processor in event of failure of the current control processor,
the method thereby enabling update communications to be made throughout the system with fault tolerance to multiple control processor failures.

These and other objects, advantages and features of the present invention will be more fully understood from consideration of the following detailed description of a preferred embodiment, presented in conjunction with the accompanying drawings.

DETAILED DESCRIPTION OF A PREFERRED EMBODIMENT

Pertinent portions of a distributed multi-processing system 10, of the type generally described in U.S. Pat.

No. 4,228,496, the disclosure of which is incorporated herein by reference, are shown in the Figures. Typically, such systems include from two to sixteen distributed processors 12 (only sip of which are illustrated) Each of the processors 12 of the system includes a memory storage area 14 and ideally maintains system control information in its memory storage area 14 which is consistent with the control information maintained by every other processor 12.

CONFIGURATION OF SYSTEM 10

The global update method of the present invention is characterized by five general conditions.

First, one of the processors 12 is designated as a global update control or "locker" processor 12LP. The locker processor 12LP coordinates the distribution of global update message packets throughout the system 10 and it is the primary mechanism by which recovery from processor failures is carried out. The processor 12 which is first to be loaded and up is designated as initial locker processor 12LP, and it continues in its role as locker processor until it fails or is removed from service. When the current locker processor 12LP fails or is down for any reason, a successor locker processor is selected in accordance with a prearranged plan of succession.

Figure 1:
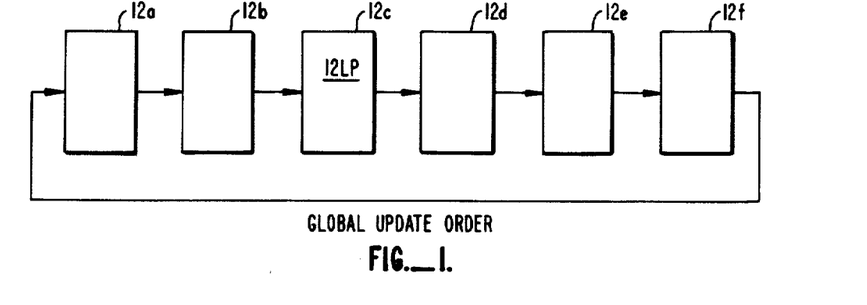
FIG. 1 is a diagram of a global update order for multiple processors in a distributed data processing system in accordance with the principles of the present invention.

Second, the plan of succession is initially determined and it provides an ordering of all processors 12 insofar as the present global update method is concerned. This predetermined global update order begins with the initial locker processor 12LP and includes every other processor exactly once, before repeating itself. Any ordering or arrangement will work, but the order must be known a priori any failure. A natural sequential ordering is shown in FIG. 1 for a six processor system 10, wherein processor 12c is the initial locker processor 12LP, and the global update order of succession is as follows:

12c, 12d, 12e, 12f, 12a, 12b, 12c . . .

A more general statement of an acceptable ordering arrangement of the present method is:

L, L+1, L+2, . . . , N−1, 0, 1, . . . L−1 where L stands for the locker processor and N is the number of processors present in the system 10. It is to be understood that every processor 12 of the system 10 is assigned a unique processor identification number in the ordering arrangement which is always associated with its respective processor.

Third, a global update semaphore is provided in the memory storage area 14 of each processor. A semaphore GLUP-LOCK is used to identify the processor that is currently allocated the semaphore and is in the process of broadcasting a global update. The processor broadcasting the global update is referred to as a sender processor. The semaphore GLUP-LOCK is a controlling semaphore only in the locker processor 12LP. If the semaphore area of the locker processor 12LP is cleared, this condition means that the GLUP-LOCK semaphore is not currently allocated to any processor 12, and any processor is free to attempt to capture the semaphore area of the locker processor 12LP and thereupon carry out a global update procedure. In every other processor 12, the semaphore area is never deallocated, and it always contains the identifier of the processor that last sent it a global update message. This retained information is needed in order for the system 10 to recover from processor failures in accordance with the present invention.

Fourth, the storage area 14 of each processor 12 includes a global update sequence number GLUP-SEQ. If no global update is presently being broadcast and processed by the system 10, then all processors 12 will have identical sequence numbers GLUP-SEQ. Each time a processor 12 receives and stores a global update message in its storage area 14, it increments the global update sequence number GLUP-SEQ by one.

Fifth, the storage area 14 of each processor 12 must contain the last update processed by that particular processor 12 as an atomic operation (i.e. partial global update messages are never retained, only complete ones). Thus, the storage area 14 of each processor 12 will contain in normal operation a copy of the last global update message that was sent from a sender processor 12SP.

In the presently preferred system 10, the sender processor 12SP is a processor having control information useful to or needed by all of the up processors of the system. Global update messages are therefore broadcast by a processor as sender processor 12SP, in a number of situations. One situation for a global update message is to indicate that a change has been made to the external communications network topology of the system so that each processor will know how to route network messages efficiently. A global update will also be sent when a new agent process becomes responsible for performing all accesses to an input/output resource. A global update will be used to deliver information concerning system events to every process that is to be notified of the event, such as a processor being up or down, a network connection has failed, etc. A global update will also be sent to change the time of day clock in each processor when a change is required on account of power failures, operator errors, hour transitions between daylight savings and standard time, etc. A global update will be sent to inform the system 10 that a down processor 12 is being reloaded, to ensure that no two processors are reloaded simultaneously.

FAULT FREE GLOBAL UPDATE WITHIN SYSTEM 10

Figure 2:
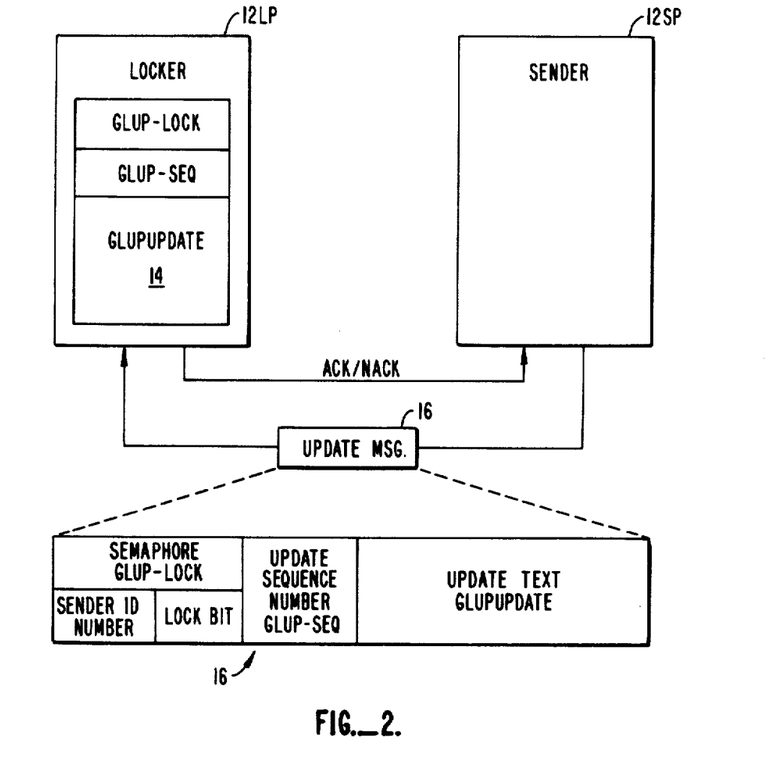
FIG. 2 is a diagram of a global message update packet and inter-processor communications environment in accordance with the principles of the present invention.

As diagrammed in FIG. 2, a global update message packet 16 contains four elements: the identifier number of the updating sender processor 12SP; a lock bit that signals the need to obtain the GLUP-LOCK semaphore, or distinguishes a locking update from a non-locking update; the global update sequence number GLUP-SEQ as sent by the sender processor 12SP; and, a description of the global update. The format of this description may vary, depending upon the type of update. In its preferred form, the global update message packet 16 is distinguishable by the processors 12 from all other messages.

FIG. 2 also illustrates important aspects of a global update message broadcast. In the presently preferred embodiment of the inventive method, each processor 12 is aware of whether every other processor is operational. This information is obtained by each processor by following an "I'm alive" protocol, which may be of the type previously described.

In the present method the same global update message packet 16 is sent by the sending processor 12SP sequentially to every processor 12 in accordance with the predetermined global update order. Every processor acknowledges the message positively (ACK) or negatively (NACK) within a very short time period. In the event that a receiving processor fails to acknowledge the global update message within the short time period, the unresponsive receiving processor is declared to be down by the remaining processors.

An unacknowledged message will be resent periodically until either it is acknowledged by the receiving processor or the receiving processor is declared to be down. The "I'm alive" protocol ensures that one event or the other will occur within a very short time period. In the present method, a declaration that the unresponsive receiving processor is down is considered to be the equivalent to receiving a negative acknowledgement (NACK).

A global update broadcast is performed serially by sending a global update message to each processor in accordance with the update order. Only one global update message is sent to one processor at a time. Following acknowledgment of the message, the message may be sent to the next processor in the global update order. This serial transmission sequence is followed unitl every up processor 12 of the system 10 has been sent and has acknowledged the global update message.

The sender processor 12SP sends the first message of a global update to the locker processor 12LP. This first message has the lock bit set. The locker processor 12LP either permits the global update to proceed (by returning a positive acknowlegement (ACK) to the sender processor 12SP) or it notifies the sending processor 12SP that a collision has occurred (by returning a negative acknowledgement (NACK)). A collision terminates the broadcast, and the sending processor must later retry to send the update to the locker processor 12LP.

A collision occurs when the GLUP-LOCK semaphore is already allocated, or when the GLUP-SEQ update sequence number transmitted does not match the sequence number in the locker processor 12LP, or when the receiving processor does not consider itself to be the locker processor. (This last situation can arise when the current locker processor has just failed and the processor in the global update order next in line to become the locker has not yet declared the current locker processor to be down.)

If the global update is permitted to proceed, the same message is then sent to every other processor 12 in global update order, with the exception that in each message sent to every other processor the lock bit is not set. After every other processor 12 has been sent and has acknowledged the global update message, the message is resent to the locker processor 12LP with the lock bit not set this second time. The locker processor 12LP recognizes the second transmission of the same update (with the lock bit not set) as a notification that the global update has been successfully completed by the sending processor 12SP.

When system control information needs to be updated (upon occurrence of any of the events previously described), the normal steps for carrying out a global update in the absence of a processor failure are summarized as follows:

1. One processor 12 recognizes that it has updated system control information needed by the remaining up processors 12. It then becomes a sender processor 12SP by constructing a global update message containing updated information, and by assigning a global update sequence number GLUP-SEQ to the update message.
2. The sender processor 12SP first sends the global update message to the locker processor 12LP. This first message of the global update broadcast has its lock bit set and is thereby marked as a locking first update message.
3. Upon receipt of this message, the locker processor:
    a. checks to determine whether the semaphore GLUP-LOCK is already allocated to another processor 12. If the semaphore is already owned by another processor, the message from the sender processor 12SP is acknowledged negatively (NACK) by the locker processor, and the sender processor will terminate the broadcast and retry later. (Typically, the sending processor 12SP will delay for a short period of time and reattempt the update).
    b. compares the global update sequence number GLUP-SEQ in the update message with the current GLUP-SEQ number stored in its own storage area 14. If the sequence numbers are not equal, the message is negatively acknowledged by the locker processor 12LP, which terminates the global update broadcast.
    c. ensures that the update is a locking update. The locker processor 12LP negatively acknowledges any first global update message in which the lock bit is not set, since there can be only one locker processor acting for the system 10 at any given time, and since all other processors are expected to know the identity of the current locker processor 12LP. Other interprocessor messages which are not global updates may be received and processed independently by appropriate processors in the system. Such other messages may include or affect control information.
4. When the locker processor 12LP determines that the global update may be processed, it
    a. allocates the semaphore GLUP-LOCK to the sender processor 12SP,
    b. writes the sending processor's identifier into its semaphore area as the value for the semaphore GLUP-LOCK;
    c. increments its global update sequence number GLUP-SEQ in its own storage area by one, in anticipation of receiving the next valid global update message;
    d. saves the global update message 16 in its storage area 14; and
    e. processes the update and positively acknowledges (ACK) the message to the sending processor 12SP.
5. The sending processor 12SP sends a non-locking update message to every other processor, one at a time, in the global update succession order. Each receiving processor in its turn:
    a. compares the global update sequence number GLUP-SEQ in the update message with the current GLUP-SEQ number stored in its own storage area 14. If the sequence numbers are not equal, the message is negatively acknowledged (NACK) by the receiving processor upon the assumption that the current update is a duplicate message. A negative acknowledgement (NACK) from a receiving processor which is not the current locker processor does not terminate the global update message broadcast.

b. ensures that the update is a non-locking update. A locking update may be received only in the event that a processor has failed, as explained in greater detail shortly. A locking global update received by a receiving processor other than the locker processor 12LP is negatively acknowledged (NACK) by the receiving processor.

c. If the update is not negatively acknowledged by the receiving processor, the processor updates its control information in its control table by following the steps outlined in paragraph 4 immediately above.

6. Finally, the sending processor 12SP sends a nonlocking update message to the locker processor 12LP, which is recognized as the update termination message. The locker processor 12LP deallocates the semaphore GLUP-LOCK and positively acknowledges receipt of the second copy of the global update message. This step completes a successful global update sequence, and permits other processors seeking to send update messages to capture the global update semaphore GLUP-LOCK.

Figure 3:
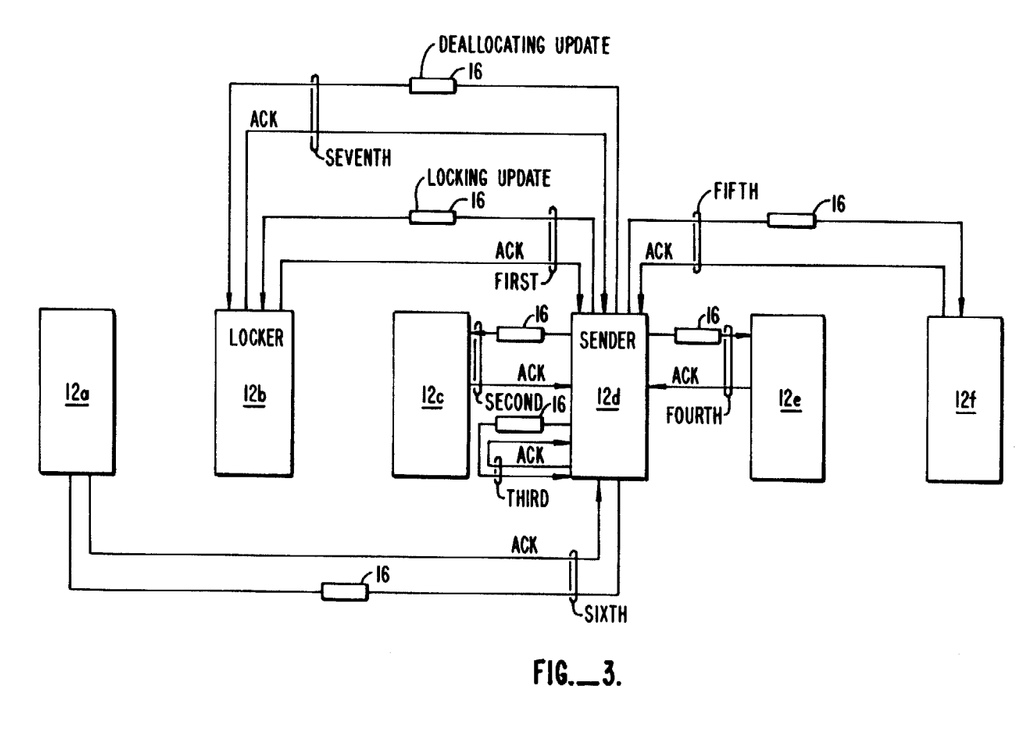
FIG. 3 is a diagram of a six processor distributed multi-processing system undergoing global update in accordance with the principles of the present invention.

The message flow for updating a six processor system 10 is illustrated in FIG. 3. The first message is the locking update that is sent to the locker processor 12LP. If this message is negatively acknowledged, the update is terminated and must be retired. Otherwise, the second through the sixth messages are sent to update the other processors. Note that the sending processor 12SP updates itself in turn in the update succession order. Finally, the seventh message is sent to the locker processor 12LP to signal the end of the update.

GLOBAL UPDATE SEQUENCE NUMBER GLUP-SEQ

The global update sequence number GLUP-SEQ has a number of uses. It eliminates the need to obtain a global semaphore when a global update is a function of the current value of the system control information. It permits a process to make a consistent copy of control information without preventing updates during the copy operation. And, it prevents duplicate updates from being processed more than once during failure recovery.

Any processor 12 wishing to make a global update performs the following operations: It makes a copy of the global update sequence number GLUP-SEQ currently stored in its memory area 14. It constructs the update, in some cases as a function of the current state of the control information on hand in its storage area 14. It performs the global update using the copied global update sequence number GLUP-SEQ. If the sequence number GLUP-SEQ in the first update message does not equal the sequence number GLUP-SEQ in the locker processor 12LP, then the control information is being changed in the interval since the sender processor first copied the update sequence number in constructing the update. Since the intervening change in control information may render the proposed update invalid, the locker processor 12LP rejects the update by negatively acknowledging it (NACK). The sender processor 12SP reobtains a copy of the update sequence number GLUP-SEQ, reconstructs the update message and sends the new message to the locker processor 12LP. The sender processor 12SP repeats this process until it is successful.

The present method eliminates the need for the sender processor 12SP to capture the GLUP-LOCK semaphore before it examines its control information to determine the need for a global update. If any global update by some other processor occurs after the sender processor begins to assemble a global update message and has made a copy of its global sequence number GLUP-SEQ, the GLUP-SEQ in the locker processor 12LP will have been incremented, and the sender processor's late global update will be negatively acknowledged by the locker processor 12LP. This situation will indicate to the sender processor that system control information may have changed and that it must reconstruct its proposed global update message based on current control information.

A similar operation may be used by a process to examine or make a consistent copy of control information without preventing global updates during the examination/copy operation. First, the process performing the copy/examination operation copies the processor's GLUP-SEQ to its own storage area. Second, it performs the examination/copy operation. Finally, it compares the copied GLUP-SEQ with the current GLUP-SEQ. If these two global sequence numbers are equal, no updates have occurred during execution of the examination/copy operation, and the entire operation is valid. If the sequence numbers are unequal, the examination/copy operation is invalid and must be performed again.

The global sequence number is also used to detect and discard duplicate updates. Some updates, such as "advance the system clock by n microseconds", must be applied exactly once in every processor. Various failures may cause the latest update to be resent to ensure that every up processor receives it. Those processors that have already received the update detect the mismatch in the global sequence number and ignore (NACK) the duplicate update message.

RECOVERY FROM FAILURE OF A SENDING PROCESSOR 12SP

When the locker processor 12LP detects a processor failure, it checks the value of the semaphore GLUP-LOCK. If this semaphore is not currently allocated, there is no global update broadcast in progress and no recovery is necessary. If the semaphore GLUP-LOCK is allocated to a sending processor other than the failed processor, no recovery is necessary.

If the semaphore value GLUP-LOCK read by the locker processor 12LP is allocated to the failing processor, then the following four step procedure is carried out.

First, the locker processor 12LP reconstructs the update message from the saved message in its own update area of storage 14 and assigns a global update sequence number corresponding to its GLUP-SEQ minus one (which corresponds to the actual sequence number in effect when that update was received).

Second, the locker processor 12LP performs a global update broadcast to resend the global update message to all processors. The first locking message is not resent, because this message was already processed by the locker processor 12LP.

Third, those processors 12 that received and processed the global update message before the sending processor 12SP failed reject the global update (NACK) because the sequence numbers do not match. The remaining processors 12 accept and process the update.

Finally, the locker processor 12LP sends the update to itself and the message is recognized as an update termination. The locker processor 12LP deallocates the semphore GLUP-LOCK, thereby freeing it to be captured by other processors which may desire to carry out successive global updates.

From the foregoing it is apparent that once a global update message is accepted by the locker processor 12LP, it thereby becomes committed to completion of the broadcast of this update message throughout the system, despite failure of the sending processor 12SP; and, the message will be sent to every up processor 12 at least once, unless the locker processor 12LP and the sender processor 12SP both fail, as discussed below.

Figure 4A:
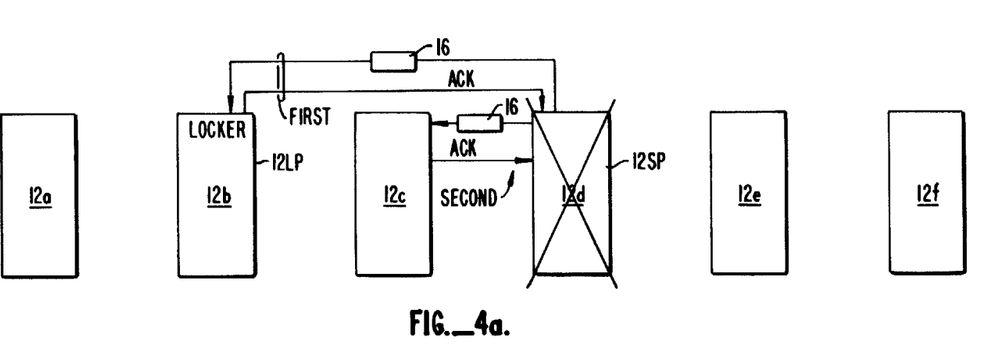
FIGS. 4a and 4b illustrate system fault tolerance in the face of a failure of a global update sender processor in accordance with the principles of the present invention.
Figure 4B:
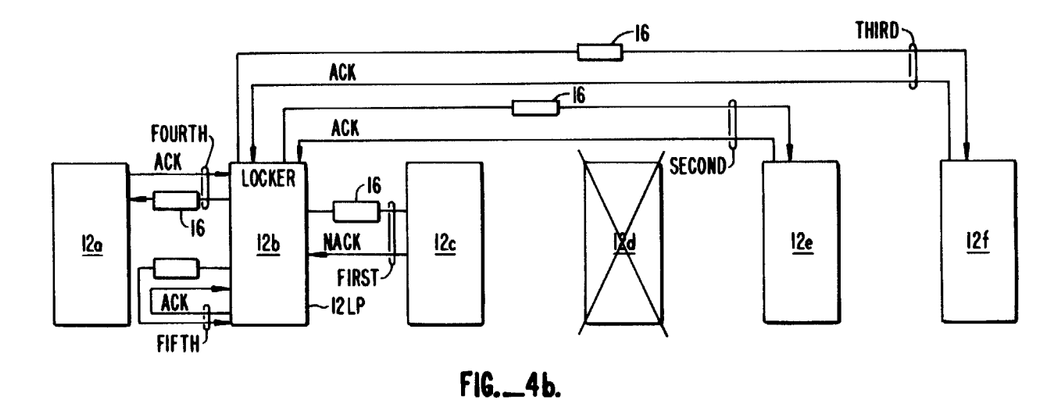

FIG. 4(a) illustrates a failure of a sending processor 12SP after it has updated both the locker processor 12LP (processor 12b) and another processor 12c. In FIG. 4(b), the locker processor 12LP resends the update to all up processors 12c, 12e, 12f, and 12a (processor 12d is now down, having failed during the global update broadcast it was sending). The update is discarded (NACK) by processor 12c because it already has received it. The locker processor 12b releases the semaphore GLUP-LOCK after receiving the update for the second time.

FAILURE OF THE LOCKER PROCESSOR 12LP

When the locker processor 12LP fails, all remaining up processors detect the failure at different times (by virtue of the "I'm alive" protocol already described). The remaining up processors unanimously agree upon the identity of a successor locker processor 12SLP in accordance with the preordained order of succession.

When the successor locker processor 12SLP detects the failure of its predecessor 12LP, the successor 12SLP takes over. Since the successor 12SLP cannot examine the state of its failed predecessor 12LP, it cannot tell if the last update was completed or not. The simplest way to ensure that the last update was completed is to send it once more, in accordance with the following steps:

First, in the successor locker processor 12SLP, the semaphore value GLUP-LOCK is already set to identify the sending processor 12SP which sent the latest global update that was processed in the successor locker processor 12SLP. The fact that the semaphore area is set to and holds this identifier prevents any new updates from being accepted until failure recovery is completed.

Next, the successor locker processor 12SLP reconstructs the last update it received using its copy of the update message and the current update sequence number GLUP-SEQ minus one.

Then, the successor locker processor 12SLP performs a global update broadcast to the up processors 12. Because each processor checks the global sequence number of every update message, duplicate messages are eliminated (NACK). Any processor 12 that did not receive the last update will accept it and process it; the others will reject it.

Finally, when the last message of the broadcast is resent to the new locker processor 12SLP by itself, it deallocates the semaphore GLUP-LOCK. The successor locker processor 12SLP will then accept and process new global updates.

Since the successor locker processor 12SLP is always the next processor in the succession order following the old locker processor 12LP, no processor other than the old locker processor ever receives any update that has not been received by the new locker processor 12SLP.

If a global update is in progress when the locker processor 12LP fails, the broadcast of the update by the successor locker processor 12SLP may overtake the broadcast by the original sender processor 12SP. Thus, a sender processor 12SP may receive negative acknowledgements (NACK) due to duplicate update messages. As already explained, these negative acknowledgements are ignored by the sending processor 12SP and it continues its own broadcast of its global update until it has been sent to all processors.

On the other hand, other processors may be sending locking updates to the successor locker processor 12SLP before it discovers that the original locker processor 12LP has failed and is now down. These updates are terminated immediately, because any processor 12 will negatively acknowledge a locking update if it does not consider itself to be the locker processor. The sending processor 12SP continues to retry its update until the successor locker processor 12SLP discovers the failure of the original locker 12LP and succeeds to that role and resends the last update it has received and processed and thereafter permits new global updates to proceed.

Figure 5A:
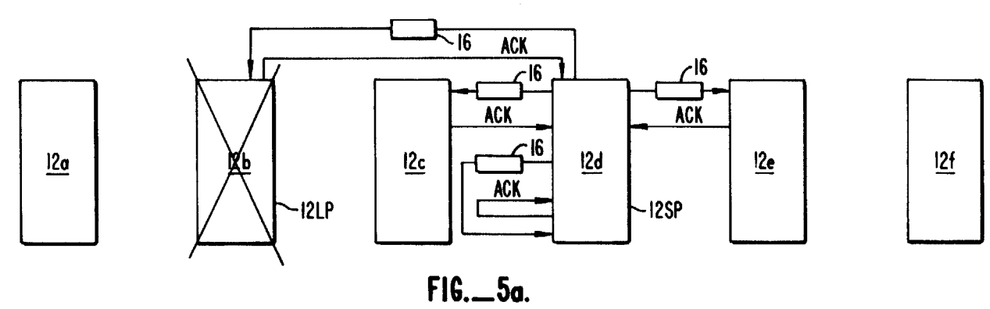
FIGS. 5a and 5b illustrate system fault tolerance in the face of a failure of a global update locker processor in accordance with the principles of the present invention.
Figure 5B:
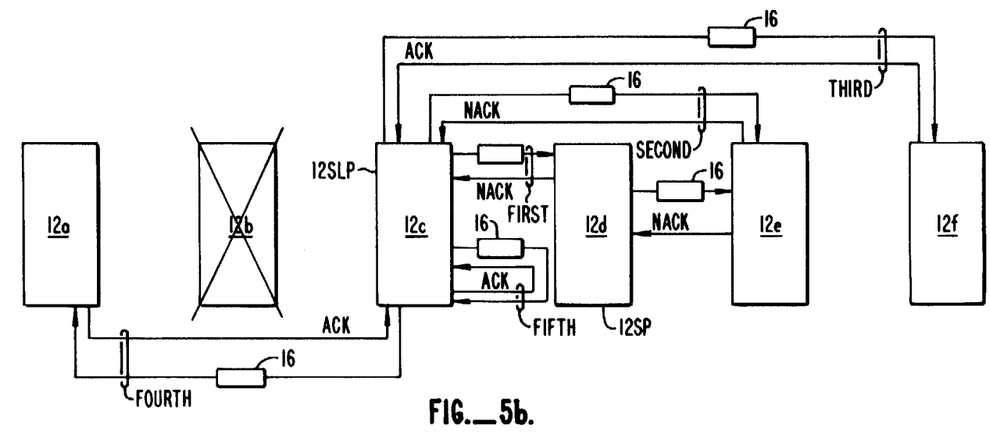

FIG. 5(a) illustrates the failure of the original locker processor 12LP (processor 12b) after processors 12b, 12c, 12d and 12e have received an update from processor 12d. In FIG. 5(b) the successor locker processor 12SLP (processor 12c) resends the last update to all up processors (processors 12d, 12e, 12f, and 12a). Processors 12c, 12d, 12e ignore (NACK) the update because it duplicates the update previously received prior to the failure of the original locker processor 12LP (processor 12b). Processors 12f and 12a accept the first message received from either the successor locker 12SLP processor (12c) or the sender processor 12d; they ignore the later received duplicate message. When the successor locker processor 12c sends message No. 5 to itself, it releases and clears the semaphore GLUP-LOCK.

FAILURE OF OTHER PROCESSORS 12

If a processor 12 other than the sending processor 12SP or the locker processor 12LP fails, then the global update proceeds normally. The global update message method of the present invention either succeeds or fails to transmit the update to the failing processor 12, but, in either case, it continues to send the update to all other up processors, including itself in its turn in the global update succession order.

DOUBLE PROCESSOR FAILURES

The most complicated cases of multiple processor failures are (a) substantially concurrent failure of a sending processor 12SP and the current locker processor 12LP, and (b) substantially concurrent failure of the current locker processor 12LP and the processor 12 in line to become the successor locker processor 12SLP. The other failure cases are simplifications of these two cases and are not described.

The concurrent failure of a sending processor 12SP and the current locker processor 12SP takes four different forms:

First, the sending processor 12SP fails before it has successfully updated the current locker processor 12LP. This update will not succeed because no up processor ever receives the update and it simply disappears.

Second, the sending processor 12SP fails after it has updated both the current locker processor 12LP and the processor following the current locker processor in the succession order. When the current locker processor 12LP fails, the new locker processor 12SLP will resend the update to all other up processors 12.

Third, the sending processor 12SP fails after updating the current locker processor 12LP, but before updating the next processor in the succession order. Then, the current locker processor 12LP fails before recovering from the failure of sending processor 12SP and before updating of the next processor in succession order. The update will not succeed as no up processor ever receives the global update message.

Fourth, the sending processor 12SP fails after updating the current locker processor, but before updating the processor next in succession order. Then the locker processor 12LP fails after recovering from the failure of the sending processor 12SP and updating the next processor in succession order. The update will succeed because the next processor will become successor locker processor 12SLP and will resend the update to the remaining up processors as already explained.

The concurrent failure of the current locker processor 12LP and the successor locker processor 12SLP is simply handled because updates are always sent in succession order, and processors 12 become the successor locker processor 12SLP in accordance with the a priori succession order. The processor 12 next in order following the successor locker processor 12SLP will become second successor locker processor 12SSLP. If the sending processor 12SP (or one of the predecessor locker processors following the failure of the sending processor 12SP) updates this second successor locker processor 12SSLP before it takes over its new roll as locker, then the update will be carried out throughout the system 10. Otherwise, no processor 12 is updated.

MULTIPLE PROCESSOR FAILURES

Failures of three or more processors 12 are easily broken down into the previously described cases. The essential rules are: First, if the sending processor 12SP does not fail, then the update will be successful if it obtains the semaphore GLUP-LOCK with its locking (i.e. first) update message. Second, if the sending processor 12SP fails, then the update will be successful if it is transmitted to a processor that is (or will succeed to) locker processor and which does not fail; otherwise, the update is confined only to down processors and has no effect throughout the rest of the system 10.

RELOADING AND SYNCHRONIZING A DOWN PROCESSOR

When a down processor is restored to operation (following a repair, for example) and reloaded in order to make it an up processor, the control information must be copied to the resource table of the reloaded processor from a current up processor's resource table.

In the system depicted by the referenced and incorporated prior U.S. Pat. No. 4,228,496, a down processor is reloaded in the following manner:

First, the processor 12 is reset and placed in a state to receive a memory image across the interprocessor bus.

Second a RELOAD process is executed in any up processor 12 which sends a memory copy of a file image to the down processor; it also sends a message to every other processor to expect the down processor to come up.

Third, the RELOAD process notifies the processor 12 to begin executing; its message system is activated to send messages and to receive other messages, particularly global update messages. Every other up processor 12 recognizes that the down processor 12 is now up and begins to exchange the "I'm alive" and other message packets with it.

Fourth, the RELOAD process sends additional control information messages to synchronize the reloaded processor with the system. When the processor 12 is fully synchronized, it starts executing processes and performing useful tasks and work.

Reload operations must be carefully sequenced to ensure that the processor 12 has consistent copies of all control information and so that no global updates are missed during the synchronization phase. The preferable reload strategy of the operating system assumes that the copying of control information from the reloader processor 12 to the reloaded processor 12 is a retryable operation and that control information copy operations require less time than the time between global update messages.

In the reloader processor, the RELOAD process performs the following operations:

1. It obtains a copy of the current global update sequence number GLUP-SEQ.

2. It sends control information messages to the reloaded processor 12. These are not global update messages and are not subject to the global update message method described herein.

3. It broadcasts a global update to all up processors 12, including the reloaded processor 12, containing the copied sequence number GLUP-SEQ and the update operation code to "make control information valid".

4. If the global update fails due to an expired or superseded sequence number, or update collision, the RELOAD process returns to the first step above.

The reloaded processor 12 performs the following operations:

First, if a normal global update message is received, the kornel consults a local flag, "control information is valid". This flag is not set when the processor 12 is reloaded; if it is still not set, the processor discards the global update.

Second, if a control information message packet is received from the RELOAD process, the processor stores the control information in the proper table. The reloaded processor 12 must be prepared to receive duplicate control information messages and cancel the effect of all such duplicates except the last.

Third, when the "make control information valid" update is received, the processor 12 sets the "control information is valid" flag and processes all subsequent global updates in a normal fashion. It is the responsibility of the RELOAD process (by using global update messages) to determine that the reloaded processor 12 has received the current control information.

The control information copy operation is protected by the availability and use of the global update sequence numbers. If a global update message having a text to "make control information valid" is successfully broadcast, then no global updates occured between the beginning of the control information copy and receipt of the global update in the reloaded processor 12. Once the "control information is valid" flag is set, the control information in all processors 12 is identical and will be kept in agreement by the global update method of the present invention.

If the amount of control information is too large, then it will be necessary to divide it into sections. Each section will require its own "control information is valid"

flag and its own "make control information valid" global update operation.

The processor 12 being reloaded must not reference control information before it is validly copied from the reloading processor 12. The processor disables process dispatching until all control information in the reloaded processor 12 is valid, which effectively eliminates all operations that access or update control information.

If any processor 12 fails during a reload operation, it becomes a very complex task to ensure that the reloaded processor 12 is consistent with the other processors. Since the processor 12 being reloaded has not reached the stage at which it is performing useful work, it simply takes itself to the down state, unless and until its "control information is valid" flag is set.

EXEMPLARY SOFTWARE IMPLEMENTATION

The following program fragments in the Pascal programming language illustrate one implementation of the global update method of the present invention. Text that is preceded by dashes (--) indicate a narrative description of code that is not illustrated by Pascal code. Text within braces are comments describing the Pascal code.

Global Types

| | |
|---|---|
| type Acknack = | (Ack, Nack1, Nack2, Failed); {replies from a Sendupdate} |
| Cpunum = | 0 . . . 15; {range of processor numbers} |
| Semaphore = | (Cpunum, nul); {semaphore can be held by a processor} |

PROCESSOR STATE VARIABLES

In each processor 12, the operating system kernel maintains the following variables describing the state of the global update method and process:

| | | |
|---|---|---|
| var | Mycpu: | Cpunum; {identifies processor} |
| | Lockercpu: | Cpunum; |
| | Cpuisup: | array [Cpunum] of Boolean; {true if cpu is up} |
| | GLUPLock: | Semaphore; {GLUP Semaphore} |
| | GLUPSeq: | integer; {GLUP Sequence number} |
| | GLUPUpdate: | array [0 . . . ?] of integer; {update description} |

The variable Mycpu is set by accessing a set of switches that uniquely identifies the processor 12a to 12p to itself. When the first processor 12 is loaded, the variable Lockercpu is set to that processor's number. The Cpuisup array is set to all false, except for the entry corresponding to the first loaded processor. The GLUPLock is set to nul and GLUPSeq is set to zero. When subsequent processors 12 are loaded, the processor performing the reload copies its own values for Lockercpu and Cpuisup to the processor being reloaded. GLUPLock is set to nul. GLUPSeq is set to the sequence number of the first update received by the processor 12 performing the reload.

MESSAGE SYSTEM PRIMITIVE FUNCTIONS

The message system functions used by the global message update method of the present invention are described by the following two functional procedures:

function Sendupdate (Tocpu, Lockbit, Update): Acknack;

this function packages the update sequence number, locking
update bit, and the array describing the update, and then
delivers it to the processor 12 described by "Tocpu".
In
the destination cpu, the message system invokes:
function Receiveupdate (Fromcpu, Seq, Lockbit, Update): Acknack;
this function examines and processes the parameters sent
to it from the "Fromcpu" and returns an ack/nack code
which has one of three values: Ack, Nack1, or Nack2.
This code is sent to the sending processor 12SP and is returned to the caller of Sendupdate.
If the destination processor 12 fails, the caller of
Sendupdate receives a return value of Failed.
Only one update message can be received and processed by a
processor 12 at a time.

BROADCASTING A GLOBAL UPDATE

When one processor 12 wishes to perform a global update it executes the following code:

```
procedure Doupdate;
    var   Seq: integer;
          Update: array [0 . . . ?] of integer;
          Reply: Acknack;
    Retry: {return to here if update fails}
    Seq: = GLUPSeq
    describe the update by referencing tables within the
    processor. Place this information in the array Update
    {send update message to every up cpu starting with the locker
    cpu. Send last message to locker cpu again.}
    for i := 0 to 16 do
        begin
        Cpu := (i + Lockercpu) mod 16;
        if Cpuisup [Cpu] then {ignore down processors}
        begin
        {only first send is locking send}
        Lockbit := (if i = 0 then true else false);
        {Send update message to the cpu, getting an
        ack/nack code in reply}
        Reply := SendUpdate (Cpu, Seq, Lockbit, Update);
        {if a failure on the locking packet then retry}
        if (Reply < > Ack) and Lockbit then go to Retry;
        end
    end
end;
```

PROCESSING THE GLOBAL UPDATE MESSAGE

In each up processor 12 the message system retrieves the global update message, processes it as follows, and replies with an Acknack code.

```
function Receiveupdate( Fromcpu, Seq, Lockbit, Update ):
Acknack;
    {test if update can be accepted and processed}
    if Mycpu = Lockercpu then {this processor is locker}
        begin
        if Lockbit then {a locking update received}
            begin
            {Nack if GLUP semaphore not free}
            if GLUPLock < > nul then goto Replynack};
            end
        else {non locking update sent to Locker CPU 12LP}
            begin {probably an update termination}
            if GLUPLock = Fromcpu and Seq = GLUPSeq - 1 then
                begin {yes: release semaphore and exit}
```

```
            GLUPLock := nul; goto Replyack;
          end
        else goto Replynack2 {probably a Locker takeover}
      end
    else {this is not the Locker processor}
      if Lockbit then goto Replynack1; {locking update
        sent to wrong processor}
      {update appears valid - is it in sequence?}
      if Seq <> GLUPSeq then {not in sequence; is it a
      duplicate?}
          if Seq + 1 = GLUPSeq and Update = GLUPUpdate
            then goto Replyack {yes; same as last update}
          else goto Replynack1; {no, not a duplicate}
      {update is valid - accept it}
      GLUPSeq := GLUPSeq + 1; {increment processor's update
      seq}
      GLUPLock := Fromcpu {allocate semaphore}
      GLUPUpdate := Update; {save update description for retry}
      process update - this code depends on the actual
      information being updated in the processors' tables
      Replyack:     Receiveupdate := ack; goto exit;
      Replynack1:   Receiveupdate := nack1; goto exit;
      Replynack2:   Receiveupdate := nack2;
      Exit:
    end; Receiveupdate
```

RECOVER FROM PROCESSOR FAILURE

The following procedure is invoked in each processor 12 when that processor discovers that another processor has failed. If necessary, a new locker processor is selected and the latest update is resent to ensure that it was received by all processors.

```
Procedure Processorfailure ( Failedcpu );
Cpuisup( Failedcpu ) := false;
if Failedcpu = Lockercpu then {Has locker cpu failed?}
  begin {yes: select new Lockercpu}
    repeat
      Lockercpu := (Lockercpu +1) mod 16
    until
      Cpuisup( Lockercpu )
    {if this processor becomes locker, resend the last update
    received by the processor}
    if Lockercpu = Mycpu then call Resendlastupdate;
  end
{if the last updating processor fails before the update is
completed, the locker resends the last update}
if Lockercpu = Mycpu and GLUPLock = Failedcpu then
  call Resendlastupdate;
end;
```

RESENDING A GLOBAL UPDATE

When the locker processor 12LP resends a global update, it executes the following code:

```
procedure Resendlastupdate;
var Reply: Acknack;
{send update message to every up processor starting with
the first processor after the locker processor. Send last
message to the locker processor.}
for i := 1 to 16 do
  begin
    Cpu := (i = Lockercpu) mod 16;
    if Cpuisup [ Cpu ] then {ignore down processors}
      begin
        {only first send is locking send}
        Lockbit := false;
        {Send update message to the cpu, getting an
        ack/nack code in reply}
        Reply :=
          SendUpdate( Cpu, GLUPSeq − 1, Lockbit,
          Glupdate );
      end
```

```
    end
  end;
```

Having thus described an embodiment of the invention, it will now be appreciated that the objects of the invention have been fully achieved, and it will be understood by those skilled in the art that many changes and widely differing embodiments and applications of the invention will suggest themselves without departure from the spirit and scope of the present invention, as more particularly defined by the following claims. The disclosures and the description herein are purely illustrative and are not intended to be in any sense limiting.

I claim:

1. A method for communicating updated information among processors in a distributed data processing system comprising a plurality of distributed, interconnected processors each having a memory, including the steps of:
   a. prioritizing the processors into a predetermined order;
   b. establishing one of the processors as a control processor for the broadcast of update messages;
   c. developing an update message having a plurality of bit positions in at least one of the processors;
   d. the one processor broadcasting the update message to each of the processors in the following manner:
      (1) sending the update message first to the control processor with at least one bit position set to a first state, the control processor acknowledging the update message if no other update message is in the broadcast process;
      (2) sending the update message to each of the other processors with the one bit position set to a second state;
      (3) sending the update message again to the control processor with the one bit position set to the second state to indicate completion of the broadcast; and
   e. causing, in the event the control processor fails, the next processor in order to be selected as the control processor.

2. The method for communicating updated information set forth in claim 1 wherein the step of broadcasting the update message comprises sending the update message to each processor in accordance with the predetermined order.

3. The method for communicating updated information set forth in claim 1 wherein the step of developing an update message includes the step of providing an update sequence number for the message.

4. A multiple fault tolerant global update method in a distributed data processing system comprising a plurality of distributed, interconnected processors, each of said processors including message passing means for passing and receiving messages to and from every other of said processors for thereby enabling each said processor to monitor current operational status of every other of said processors and to send and receive global update messages, said method including the steps of:
   a. identifying an initial locker processor and arranging all of said processors into an order,
   b. setting an update lock semaphore in a storage area of the locker processor to identify a current sender processor by first sending a message to the locker processor from the sender processor, c. after setting the update lock semaphore in the locker, the sender processor broadcasting the message to every other processor, d. storing an update lock semaphore in each processor identifying the sender processor of the last global update message received, e. clearing the update lock semaphore area in the locker processor at the completion of the broadcast.

5. The global update method set forth in claim 4 including the further step of rebroadcasting from the locker processor of the message to the remaining processors in the event that the sender processor fails after it has sent the message to the locker processor and before the update lock semaphore area of the locker has been cleared.

6. The global update method set forth in claim 4 including the further step of automatically transferring the locker processor role to a next processor in the order in the event that the next processor learns that the current locker processor has failed.

7. The global update method set forth in claim 6 comprising a further step in which said next processor rebroadcasts the latest global update message to all other up processors upon becoming locker processor.

8. The global update method set forth in claim 8 for recovering from a failure of the locker processor during a message broadcast, including the further step of setting the semaphore to identify the next processor in the order and resending the message from the next processor as successor locker processor to every other processor.

9. The global update method set forth in claim 6 wherein the step of clearing the update lock semaphore area in the next locker processor at the completion of the broadcast comprises the step of resending the message to the next locker processor from itself in order to clear its semaphore area.

10. The global update method set forth in claim 4 wherein messages are passed on a repetition basis between all processors of the system in order for each processor to monitor current operational status of every other processor.

11. The global update method set forth in claim 4 wherein the step of broadcasting the message further comprises the step of providing each processor with an update sequence number for the message.

12. The global update method set forth in claim 4 wherein the step of broadcasting the message from the sender processor to every other processor is carried out as an atomic operation.

13. The global update method set forth in claim 4 wherein the step of setting the update lock semaphore in the storage area of the locker processor can be carried out only when no other message broadcast is in progress.

14. The global update method set forth in claim 13 further comprising the step of sending a message to the locker processor which includes setting a lock bit in order to set the update lock semaphore, and wherein the step of broadcasting the message to the other processors includes the step of clearing the lock bit before transmission.

15. The global update method set forth in claim 11 wherein each processor compares the update sequence number for the message received with the update sequence number previously recorded in the processor corresponding to the last message.

16. The global update method set forth in claim 15 comprising the step of negatively acknowledging to the sender processor of a message when its update sequence number does not correctly correspond with the previously recorded update sequence number.

17. A global update method for tolerating multiple processor failures of a distributed data processing system comprising a plurality of distributed, interconnected processors, each of said processors including message passing means for passing and receiving messages to and from every other of said processors for thereby enabling each said processor to monitor current operational status of every other of said processors and to send and receive global update messages, said method including the steps of:

a. identifying an initial locker processor and arranging all of said processors into an order, b. setting an update lock semaphore in a storage area of the locker processor to identify a current sender processor by first sending a message to the locker processor from the sender processor, c. after setting the update lock semaphore in the locker, the sender processor broadcasting the message to every other processor, d. storing an update lock semaphore in each processor identifying the sender processor of the last global update message received, e. clearing the update lock semaphore area in the locker processor at the completion of the broadcast, and f. rebroadcasting from the locker processor of the message to the remaining processors in the event that the sender processor fails after it has sent the message to the locker processor and before the update lock semaphore area of the locker has been cleared.

18. A global update method for tolerating multiple processor failures of a distributed data processing system comprising a plurality of distributed, interconnected processors, each of said processor including message passing means for passing and receiving messages to and from every other of said processors for thereby enabling each said processor to monitor current operational status of every other of said processors and to send and receive global update messages, said method including the steps of:

a. identifying an initial locker processor and arranging all of said processors into an order, b. setting an update lock semaphore in a storage area of the locker processor to identify a current sender processor by first sending to the locker processor from the sender processor a message having a plurality of bit positions with at least one of the bit position set to a first state, c. after setting the update lock semaphore in the locker, broadcasting the message from the sender processor to every other processor with the bit position set to a second state, d. storing an update lock semaphore in each processor identifying the sender processor of the last global update message received, e. clearing the update lock semaphore area in the locker processor at the completion of the broadcast, f. automatically transferring the locker processor role to a next processor in the order in the event that the next processor learns that the current locker processor has failed.

19. The global update method set forth in claim 18 wherein the step of transferring the locker processor role to the next processor in the order is carried out only after the message has been sent to the next processor in the order.

20. A global update method for tolerating multiple processor failures of a distributed data processing system comprising a plurality of distributed, interconnected processors, each of said processors including message passing means for passing and receiving messages to and from every other of said processors for thereby enabling each said processor to monitor current operational status of every other of said processors and to send and receive global update messages, said method including the steps of:
   a. identifying an initial locker processor and arranging all of said processors into an order,
   b. setting an update lock semaphore in a storage area of the locker processor to identify a current sender processor by first sending a message to the locker processor from the sender processor,
   c. after setting the update lock semaphore in the locker, the sender processor broadcasting the message to every other processor,
   d. storing an update lock semaphore in each processor identifying the sender processor of the last global update message received,
   e. clearing the update lock semaphore area in the locker processor at the completion of the broadcast, and
   f. setting the semaphore to identify the next processor in the order and rebroadcasting the message from the next processor as successor locker processor to every other processor, in the event of a failure of the locker processor during a message broadcast.

21. A global update method for tolerating multiple processor failures of a distributed data processing system comprising a plurality of distributed, interconnected processors, each of said processors including message passing means for passing and receiving messages to and from every other of said processors for thereby enabling each said processor to monitor current operational status of every other of said processors and to send and receive global update messages, said method including the steps of:
   a. identifying an initial locker processor and arranging all of said processors into an order,
   b. setting an update lock semaphore in a storage area of the locker processor to identify a current sender processor by first sending a message to the locker processor from the sender processor,
   c. providing each message with an update sequence number,
   d. after setting the update lock semaphore in the locker, the sender process broadcasting the message to every other processor.
   e. storing an update lock semaphore in each processor identifying the sender processor of the last global update message received,
   f. maintaining a current update sequence number in each processor and negatively acknowleging any message having an update sequence number which does not correspond with the maintained current update sequence number, and
   g. clearing the update lock semaphore area in the locker processor at the completion of the broadcast.

22. A global update method for tolerating multiple processor failures of a distributed data processing system comprising a plurality of distributed, interconnected processors, each of said processors including message passing means for passing and receiving test messages to and from every other of said processors on a repetition basis for thereby enabling each said processor to monitor current operational status of every other of said processors, said method including the steps of:
   a. ordering said processors into a global update order by which one of said processors is an initial locker processor and every other processor is configured automatically to become locker processor upon failure of the current locker processor in accordance with said order,
   b. storing in each processor the last global update message including an update lock semaphore for identifying a sender processor, further including an update sequence number for said message, and further including the text of the global update message,
   c. when no other global update is being broadcast, setting the update lock semaphore in the locker processor to identify a current sender processor by first enabling an atomic global update message to said locker processor from said sender processor,
   d. after setting said update lock semaphore in said locker, the sender processor broadcasting said global update message to every other processor in said order, and
   e. clearing said update lock semaphore by resending said atomic global update to said locker professor from said sender processor after it has broadcast said atomic global update to all of said other processors.

23. The global update method set forth in claim 22 further comprising the step of rebroadcasting of said atomic global update to said remaining processors from said locker processor, in the event that said sender processor fails after it has sent said global update to said locker processor and before it has cleared said update lock semaphore.

24. The global update method set forth in claim 22 further comprising the step of automatically transferring the locker processor role to the next processor in said order in the event that said next processor learns that said current locker processor has failed after said global update has been sent to said next processor in said order.

25. The global update method set forth in claim 22 further comprising the step of setting said semaphore to identify said next processor and resending the global update from said next processor as successor locker processor to every other processor, and then resending the global update to said successor locker processor from itself in order to clear said semaphore, in the event that the sender processor and said current locker processor both fail after said atomic global update has been sent to said next processor.

26. A global update method tolerating multiple near simultaneous or simultaneous processor failures of a distributed data processing system comprising a plurality of distributed, interconnected processors, each of said processors including message passing means for passing and receiving test messages to and from every other of said processors on a repetition basis for thereby enabling each said processor to monitor current operational status of every other of said processors, said method including the steps of:
- a. ordering said processors into a global update order by which one of said processors is an initial locker processor and every other processor is configured automatically to become locker processor upon failure of the current locker processor in accordance with said order,
- b. providing a buffer area in each processor for storing an update lock semaphore for signalling that an atomic global update message is being transferred by a sender processor, an update sequence number for said message, and a global update message,
- c. when no other atomic global update is in progress, setting said update lock semaphore in the buffer area of said locker processor to identify a sender processor by first sending an atomic global update message to said locker processor from said sender processor,
- d. after setting said update lock semaphore in said locker, the sender processor broadcasting said atomic global update message to every other processor in said order,
- e. clearing said update lock semaphore by resending said atomic global update to said locker processor from said sender processor after it has broadcast said atomic global update to all of said other processors,
- f. if said sender processor fails after it has sent said atomic global update to said locker processor and before it has cleared said update lock semaphore, rebroadcasting of said atomic global update to said remaining processors from said locker processor,
- g. automatically transferring the locker processor role to the next processor in said order in the event that said next processor learns that said current locker processor has failed after said atomic global update has been sent to said next processor in said order, and
- h. if said sender processor and said current locker processor both fail after said atomic global update has been sent to said next processor, setting said semaphore to identify said next processor and resending said atomic global update from said next processor as successor locker processor to every other processor, and then resending said atomic global update to said successor locker processor from itself in order to clear said semaphore.

* * * * *